Patented Nov. 11, 1930

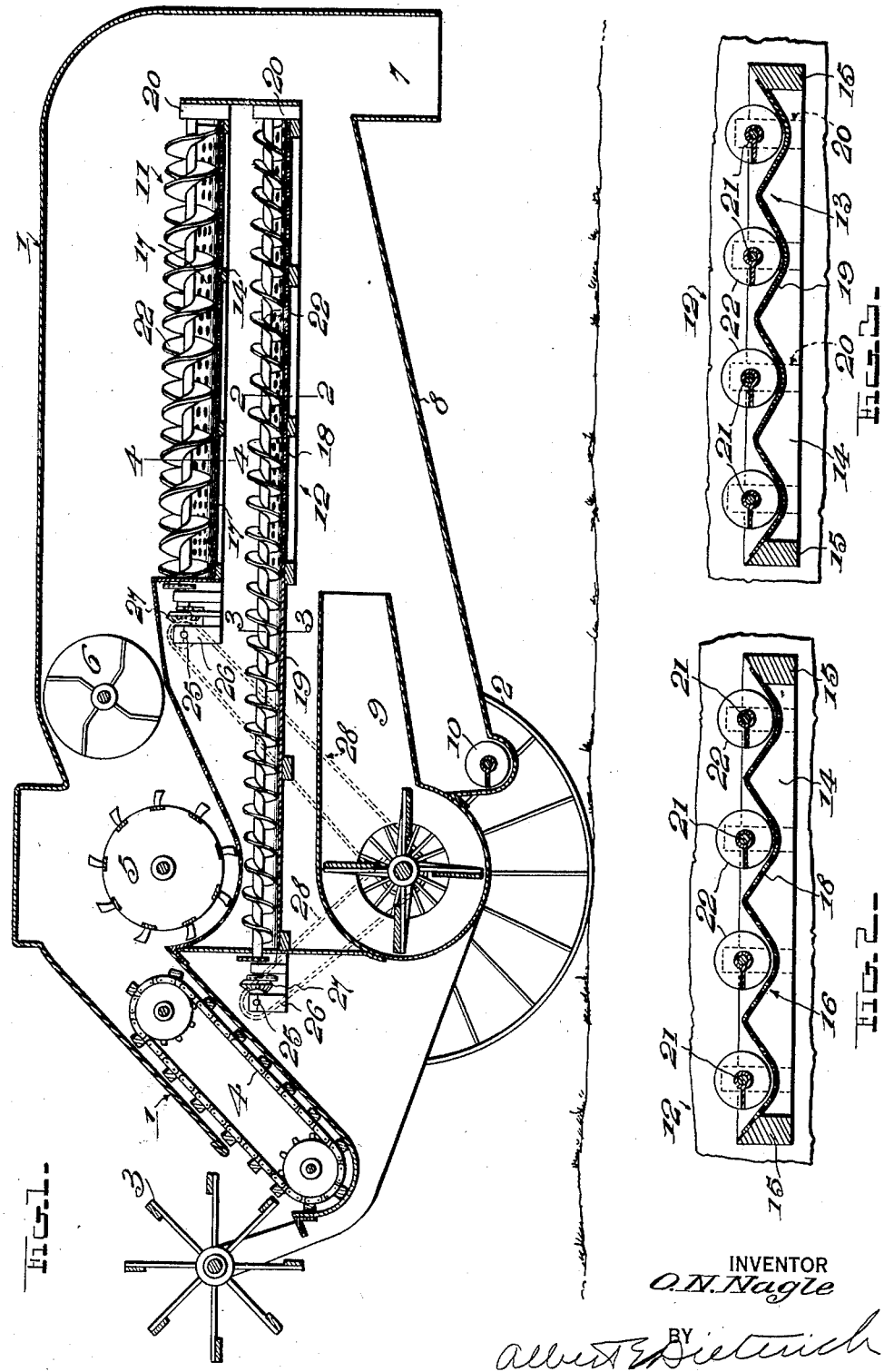

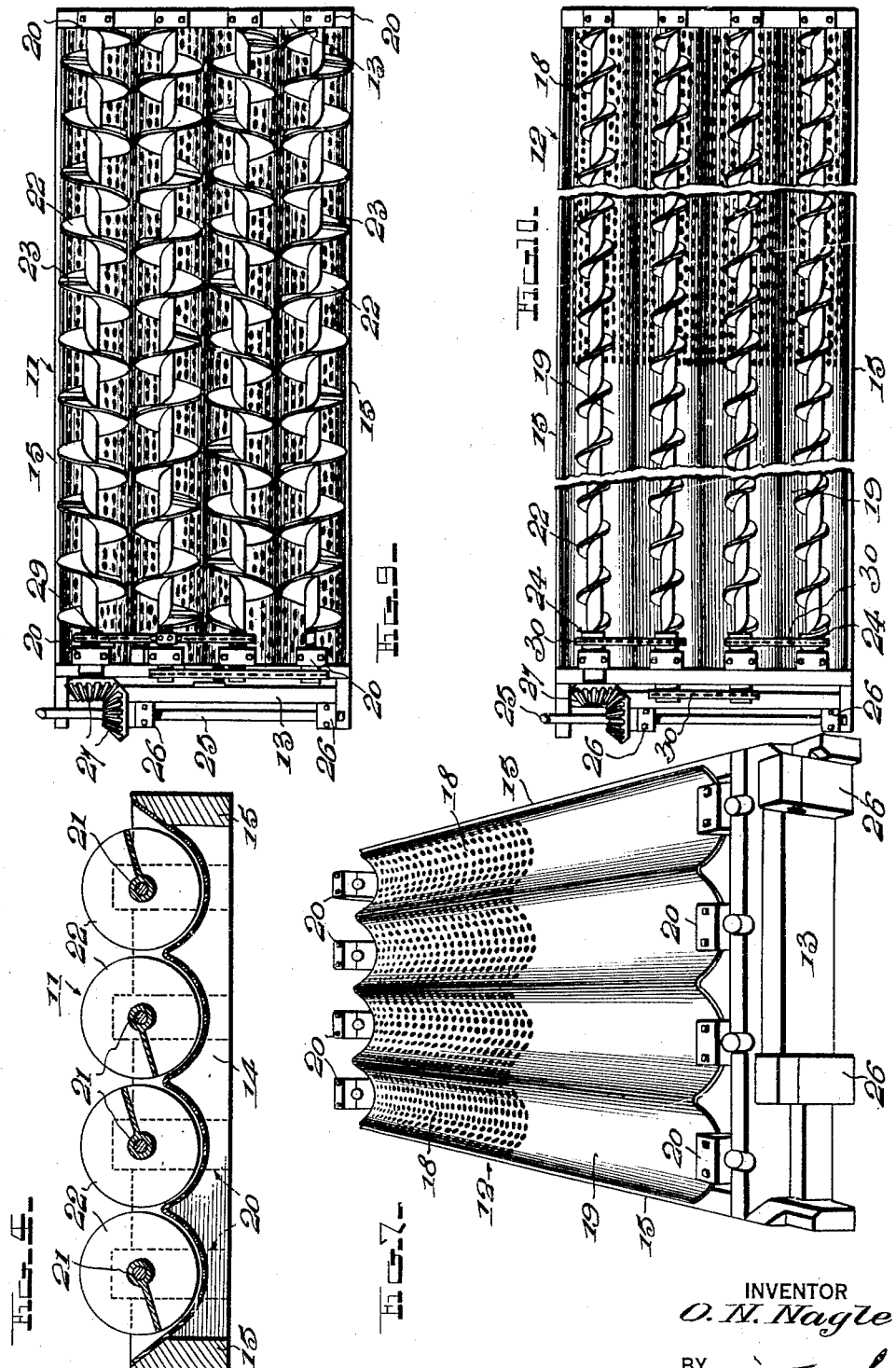

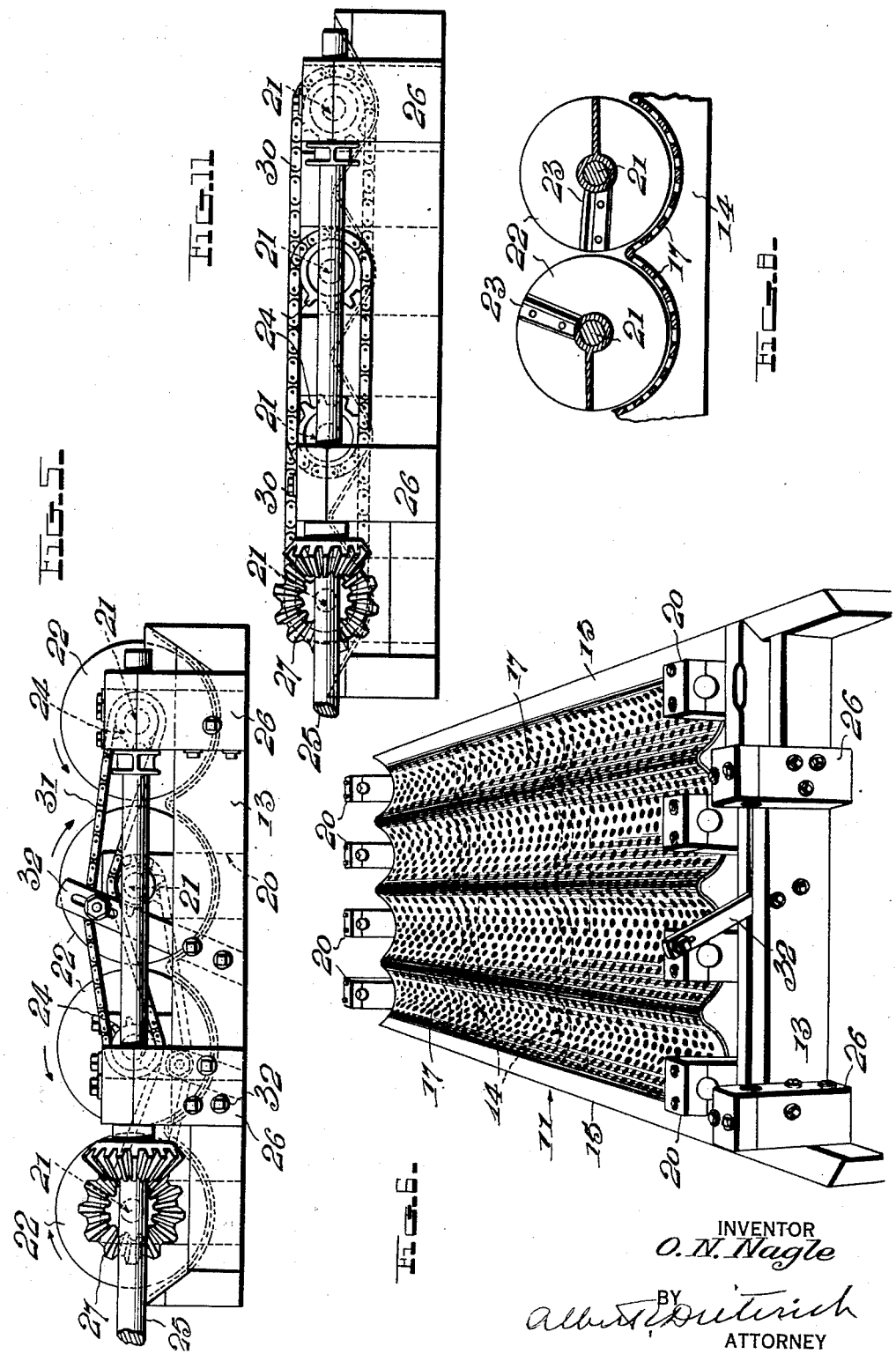

1,781,472

UNITED STATES PATENT OFFICE

OSCAR NICHOLAS NAGLE, OF TURPIN, OKLAHOMA

GRAIN SEPARATOR

Application filed March 14, 1929. Serial No. 347,144.

The invention generally relates to threshing machines, more particularly to that type in which grain is cut in standing condition then suitably separated from the straw and chaff, and delivered clean for sacking, and in which agitated straw racks and separator grain pans are employed for accomplishing the grain separation, and the said invention primarily has for its object to provide novel means to be employed as substitutes for the straw racks and grain pans and designed to accomplish the separation of the grain from the straw and chaff in a more efficient manner than is now possible and without the noise and excessive vibration and shock incident to the now conventional use of reciprocating and agitated devices.

In its more detailed nature the invention resides in the provision of novel economically constructed and ingeniously arranged screening troughs and screw conveyers constructed and arranged to supplant the usual straw racks and grain pans and to assure discharge of all straw from the threshing machine regardless of its condition, and to deliver only clean grain to the grain shoe, the said troughs and conveyers being so constructed and arranged as to be efficiently operable without undesirable noise and vibration and with a minimum of power consumption.

Other objects will in part be obvious and in part be pointed out hereinafter.

To the attainment of the aforesaid objects and ends, the invention further resides in the novel details of construction, combination and arrangement of parts, all of which will be first fully described in the following detailed description, then be particularly pointed out in the appended claims, reference being had to the accompanying drawings, in which:—

Figure 1 is a somewhat diagrammatic vertical longitudinal section of a threshing machine embodying the invention.

Figure 2 is an enlarged detail vertical cross section taken on the line 2—2 on Figure 1.

Figure 3 is a view similar to Figure 2, the section being taken on the line 3—3 on Figure 1.

Figure 4 is an enlarged detail vertical cross section taken on the line 4—4 on Figure 1.

Figure 5 is an end view of the superposed screen conveyers looking at the driving end.

Figures 6 and 7 are detail perspective views of the upper and lower trough frames respectively, the conveyers being removed.

Figure 8 is a detail view illustrating the agitator finger equipment of the upper conveyers.

Figures 9 and 10 are plan views of the upper and lower separator units respectively in their complete form.

Figure 11 is an end view of the bottom conveyer, looking at the driving end.

In Figure 1 of the drawings I have illustrated the invention applied for use on a conventional type of threshing machine. The harvester body, generally designated 1, is shown supported upon wheels 2, and the usual reel 3, intake conveyer 4, threshing cylinder 5, beater 6, chaff and straw discharge throat 7, grain shoe 8, chaff blower fan 9 and grain take-off boot 10 are also illustrated in their customary association.

When my invention is in use, the grain and straw thrown from the cylinder 5 are not delivered onto straw racks and then into a grain pan, but instead are delivered into an upper screening unit 11 which takes the place of the customary straw racks. A lower screening unit 12 is positioned beneath the unit 11 in position for receiving anything that passes through the bottom of the said unit 11. This unit 12 replaces the customary grain pan. See Figure 1.

Each of the units 11 and 12 includes a frame body composed of end cross heads 13, intermediate cross braces 14 and side beams or stringers 15. These frames each support a series of parallel connected troughs 16, those of the upper unit being reticulated or formed of screening material throughout their whole length as indicated at 17, while those of the lower unit are reticulated or screened half-length only as indicated at 18 and have their remaining halves solid as indicated at 19. The solid half portions of the lower troughs are disposed toward the front end of the machine. See Figures 1, 6 and 7.

The cross heads 13 of the unit frames support shaft bearings 20, and in each aligned pair of such bearings associated with the respective troughs a shaft 21 is rotatably mounted. The shafts 21 each carry a spiral conveyer 22, those of the upper unit being larger in diameter and alternately-reversely directed, while those of the lower unit are smaller in diameter and may all be directed in the same way. Both sets of conveyor spirals substantially drag the respective trough bottoms to assure proper conveying travel of the grain, straw and chaff.

The upper spirals are also equipped with agitating fingers 23 which serve to keep the straw moving freely and overcome tendency thereof to wrap around the shafts.

Each shaft 21 is equipped with a sprocket 24 and a power shaft 25 is supported at 26 upon an end of each of the upper and lower units. Each power shaft 25 drives one unit shaft 21 through meshing bevel pinions 27, the power shafts themselves being connected by suitable power transmitting connections 28 and driven through a common power applying medium 29 carried by one of them.

In the case of the lower unit alternate pairs of the sprockets are connected by chains 30 which take around the said sprocket pairs and serve to rotate all of the lower unit spirals in one direction. See Figure 5.

On the upper unit the chains 31 take around alternate ones of the sprockets and over or under the intermediate sprockets in the manner illustrated in Figure 5 thus causing adjacent spirals to rotate reversely. Suitable chain tighteners 32 may be employed to keep the chains 31 taut and to prevent engagement of the reversely travelling flights which double over the intermediate sprockets.

If desired the screening units may be mounted on a suitable incline, say for example in degree of one half inch of inclination in a foot of length.

The screening units constructed and arranged as herein disclosed will effectively clean the grain of straw and chaff even if wet and the parts are so constructed and arranged that the grain is not alone more efficiently cleaned but the operation is occasioned with less power consumption, less noise, shock and vibration than is occasioned in straw rack and grain pan equipped machines.

From the foregoing description, taken in connection with the accompanying drawings, it is thought that the novel details of construction, the manner of use and the advantages of my invention will be readily apparent to those skilled in the art to which it relates.

What I claim is:

1. In a threshing machine, a casing, an intake conveyor, a threshing cylinder, a beater, a grain shoe with grain offtake boot, and a blower fan delivering over the grain shoe rearwardly, said casing having a straw discharge throat toward which the blower is directed; combined with an upper screening unit located above the blower and grain pan levels and to the rear of and below said beater, and a lower screening unit located below the upper unit and above the blower and grain pan levels, said lower unit extending from a place adjacent the front of the machine below said cylinder to a place adjacent said discharge throat, each of said screening units comprising longitudinally corrugated bottoms having a plurality of trough-like portions, continuous spiral conveyors located in each trough-like portion, the bottom of said upper screening unit being foraminous from end to end, the bottom of that portion only of the lower screening unit where it lies below the upper unit being foraminous, and means to turn said spiral conveyors.

2. In a threshing machine, a casing, an intake conveyor, a threshing cylinder, a beater, a grain shoe with grain offtake boot, and a blower fan delivering over the grain shoe rearwardly, said casing having a straw discharge throat toward which the blower is directed; combined with an upper screening unit located above the blower and grain pan levels and to the rear of and below said beater, and a lower screening unit located below the upper unit and above the blower and grain pan levels, said lower unit extending from a place adjacent the front of the machine below said cylinder to a place adjacent said discharge throat, each of said screening units comprising longitudinally corrugated bottoms having a plurality of trough-like portions, continuous spiral conveyors located in each trough-like portion, the bottom of said upper screening unit being foraminous from end to end, the bottom of that portion only of the lower screening unit where it lies below the upper unit being foraminous, means to turn said spiral conveyors, said blower having its discharge end arranged to deliver adjacent the fore end of the foraminiferous part of the lower screening unit's bottom.

2. In a threshing machine, a casing, an intake conveyor, a threshing cylinder, a beater, a grain shoe with grain offtake boot, and a blower fan delivering over the grain shoe rearwardly, said casing having a straw discharge throat toward which the blower is directed; combined with an upper screening unit located above the blower and grain pan levels and to the rear of and below the beater, and a lower screening unit located below the upper unit and above the blower and grain pan levels, said lower unit extending from a place adjacent the front of the machine below said cylinder to a place adjacent said discharge throat, each of said screening units comprising longitudinally corrugated bottoms having a plurality of trough-like portions, continuous spiral conveyors located in each trough-like portion, the bottom of said upper screening unit being foraminous from end to end, the bottom of that portion only of the lower screening unit where it lies below the upper unit being foraminous, means to turn said spiral conveyors, and said spiral conveyors having their spirals alternately-reversely directed.

4. In a threshing machine, a casing, an intake conveyor, a threshing cylinder, a beater, a grain shoe with grain offtake boot, and a blower fan delivering over the grain shoe rearwardly, said casing having a straw discharge throat toward which the blower is directed; combined with an upper screening unit located above the blower and grain pan levels and to the rear of and below said beater, and a lower screening unit located below the upper unit and above the blower and grain pan levels, said lower unit extending from a place adjacent the front of the machine below said cylinder to a place adjacent said discharge throat, each of said screening units comprising longitudinally corrugated bottoms having a plurality of trough-like portions, continuous spiral conveyors located in each trough-like portion, the bottom of said upper screening unit being foraminous from end to end, the bottom of that portion only of the lower screening unit where it lies below the upper unit being foraminous, means to turn said spiral conveyors, the spiral conveyors of the upper unit lying with their perimeters in close proximity while those of the lower unit lie separated a substantial distance from each other.

OSCAR NICHOLAS NAGLE.